Oct. 2, 1934.  C. ROBINSON  1,975,434
APPARATUS FOR HOT WELDING AND ROLLING METALS AND OTHER SUBSTANCES
Filed Dec. 4, 1926   5 Sheets-Sheet 1

Fig.1.

Inventor:
Conway Robinson,
By Hodge Lewis,
Attorneys

Oct. 2, 1934.   C. ROBINSON   1,975,434
APPARATUS FOR HOT WELDING AND ROLLING METALS AND OTHER SUBSTANCES
Filed Dec. 4, 1926   5 Sheets-Sheet 3

Fig. 3.

Inventor:
Conway Robinson,
By
Attorneys

Oct. 2, 1934.  C. ROBINSON  1,975,434
APPARATUS FOR HOT WELDING AND ROLLING METALS AND OTHER SUBSTANCES
Filed Dec. 4, 1926   5 Sheets-Sheet 4

Inventor:
Conway Robinson,
By Nodget Sons,
Attorneys.

Patented Oct. 2, 1934

1,975,434

UNITED STATES PATENT OFFICE 1,975,434

APPARATUS FOR HOT WELDING AND ROLLING METALS AND OTHER SUBSTANCES

Conway Robinson, Baltimore, Md.

Application December 4, 1926, Serial No. 152,653

30 Claims. (Cl. 219—1)

This invention pertains to apparatus for welding the structure of, and for hot rolling, the metal, carbon, at suitable temperatures in a vacuum, in an inert gas, or in a gas having an affinity for oxygen or other beneficial effect. The apparatus may, however, be employed for welding, rolling, or both welding and rolling, in a vacuum or a suitable gas, other metals such as tungsten, tungsten-steel alloys, high carbon steel, special steels, or other metals or alloys, for the purposes of more readily welding or working them, removing gases, and increasing their purity, density and strength. It may also be used for rolling and welding rods or other forms of commercial "amorphous" carbon and commercial graphite, and even for producing rods or the like of such substances as glass, quartz, and porcelain. I further purpose to employ this apparatus in working as metals the true and free elemental forms of certain substances now known as "metalloids" or "non-metals". It is therefore to be understood that while I shall describe the apparatus as primarily designed for operating upon the metal carbon, my invention is not in any sense confined thereto.

Irrespective of any theory in this or other of my specifications, wherever the word "carbon" is used without qualification, or ignoring any qualification, the ordinary dictionary definition is meant; that is, I mean the chemical element carbon represented by the carbon atom. Where the word "carbon" is qualified by "metallic" or "metal", I mean a mass of atoms of the chemical element carbon, without any material impurity; such atoms being in such close association, coherency, freedom, homogeneous formation, and arrangement, that the resulting structure constitutes a metal from the physical viewpoint. Where "carbon" is qualified by a word expressing a quality of the usual industrial metals, such as plasticity, malleability, ductility, or other, I means the metal carbon as above defined, having the recited physical qualities claimed on the basis of results from various experiments and tests; these physical qualities not being inherent in the carbon atoms, or the chemical element carbon in any other form, but coming into being for the first time when the metal structure was first built up or created by artificial means and conditions.

In my application Serial No. 462,965, filed April 20, 1921, I have fully described a new form of the element carbon, the metal carbon, or metallic carbon, which I have produced and used. As there set forth this form of the element is, in general terms, a metal of comparatively low specific gravity, approximating more or less nearly that of aluminum; of silvery white color; possesses a metallic luster; is capable of being produced in or brought to a hard state or condition by mechanical working; and is further capable of being rendered malleable, or ductile, or both.

As the metal carbon comes from the secondary furnace specifically described and claimed in my application Serial No. 669,515, filed October 19, 1923, it is very pure, soft and malleable, and has a metallically coherent though porous structure. After removal from the secondary furnace, the metal carbon in sponge form is pressed up into strips, sheets or rods in steel molds, preferably by hydraulic pressure, preparatory to welding the structure completely throughout, as set forth in my said application Serial No. 462,965.

When the metal sponge of the true and free element carbon is pressed in the steel mold, much of the gas is eliminated, the pores are collapsed, and the walls of such pores come together in more or less intimate contact. Although the resulting strip or rod is apparently quite dense, with a specific gravity if subjected to very high pressure of 2.71, that is, above the specific gravity of aluminum, nevertheless some gas remains, probably very largely in adsorbed condition, and no material welding of the discontinuous portions takes place.

It is the primary object of this invention to provide a practical commercial apparatus for welding the essentially porous structure of the metal carbon to make it metallically coherent throughout instead of only partly so, and thus to put it in condition to be readily fused, wrought, hammered, rolled, drawn, or otherwise worked.

A secondary purpose of the apparatus is to roll the welded ingot into such diameters, lengths and shapes as may be desired, to increase its density, its tensile strength, or both, to further prepare it for wire drawing, or generally to improve its physical characteristics, and to practically remove any remaining gas, ash or other impurity.

With a completely coherent metallic structure secured by such welding and working, the heat conductivity of the metal carbon is slightly greater than when it is merely pressed up, and the electrical conductivity is much greater. The tensile strength is likewise greatly increased, making it practicable to draw the metal carbon into commercial wire, the commercial apparatus and process for which I propose to cover in a subsequent application. Any gas and slight remaining "ash" or other impurity which may not have been removed before the welding and rolling, is eliminated by the combination of very high temperature and mechanical working in a vacuum, leaving the metal carbon in exceedingly pure condition.

I have discovered certain facts in connection with the true and free element carbon, which I have constructed as a metal from the physical viewpoint, and also in respect to "amorphous" carbons, and graphite, (the latter particularly in the form of rods), and some of these will now be stated for the purpose of properly explaining, and permitting a clear understanding of, the underlying principles of the apparatus and treatment herein described.

(1) The true and free element carbon with the new and artificially imparted structure of a solid metal has a very low volatility or quality of sublimating, even when above the fusing point of tungsten. This is contrary to the generally accepted belief that the element carbon is quite volatile at temperatures above 2,000° C.

(2) The metal carbon can be fused at a sufficiently high temperature even in a vacuum. This is also contrary to the generally accepted theory. Sir William Crookes, for example, considered that the element carbon, because of its supposed inherent volatility, could be fused only at a pressure of seventeen atmospheres and at a temperature of 4130° C., and that the product after fusing and congealing, would be the diamond. According to his conclusions, the pressure was necessary to limit the volatility, and hence carbon could not be fused in a vacuum.

(3) The fusing and volatilizing temperatures of the true element carbon, that is, the metal carbon, in a vacuum, are very high, apparently considerably above 4,000° C.

(4) A rod of commercial graphite consists of two components, one of which is a more or less clearly graphitic component in the form of minute particles cemented together by a refractory carbon suboxide of higher oxygen content which constitutes the other component. The structure gives a great number of contacts, is not metallically coherent, and accounts for the hardness, brittleness, and negative electrical resistance-temperature coefficient of ordinary commercial graphite.

(5) A rod of "amorphous" carbon, for example an electrode for an arc lamp, consists essentially of carbon subhydrides the particles of which adhere, though there may be some carbon suboxides present and a slight amount of a graphitic component, depending upon the mode of manufacture of the carbon electrode, the original substances from which it was made, the temperatures at which, and the atmosphere in which, the electrode was fired.

(6) A graphitized carbon filament of an incandescent electric lamp has been generally considered to be a very pure form of carbon, of an especially stable and refractory nature. I have found that such filaments ultimately fail from the following causes:

a. Volatilization of the carbon sub-compounds present.

b. Chemical dissociation of such carbon sub-compounds.

c. Volatilization of the "ash" with a sputtering or slightly explosive effect.

d. The formation of compounds between the "ash" and the carbon, with a subsequent volatilization or dissociation of the compound.

e. The "burning" of the carbon by the absorbed or adsorbed gases, with the formation of carbon sub-compounds.

f. Microscopic arcing between the poor contacts of the particles, resulting in volatilization at such points and consequent disintegration of the structure.

(7) A pure and gas-free rod or strip of the metal carbon in the merely pressed-up form will finally part due to cause f only. In the case of a round rod of the metal carbon, the larger the diameter, the greater will be its cross section in proportion to its radiating surface, and consequently the lower its current density per square millimeter for any given temperature. Therefore, with two rods of the metal carbon, of the same length but different diameters and operating at the same temperature, the period before parting will be longer in the case of the thicker rod; or with the same current density per square millimeter, a higher temperature for the rod of larger diameter can be reached with the same life. This is because the point at which microscopic arcing commences depends upon the current density. If the current density be kept down sufficiently through a reduction in the energy loses, the life of the rod or its temperature may be still further increased.

(8) In the case of an electric arc supported between ordinary carbon or graphite electrodes, and to which some air has access, the arc is maintained largely through the volatilization of carbon sub-compounds which were originally in the electrode, or which may be newly formed by the access of air to the hot surfaces. The temperature of volatilization of such compounds when present in sufficient degree to support the arc, determines the temperature of the crater of the arc, which has been found to be around 3500° C.

(9) The extremely small fused globules sometimes found in the crater of the arc are probably fused carbon sub-compounds, fused "ash", or fused compounds of the "ash" with the carbon.

(10) In the case of an electric arc between metal carbon electrodes in a vacuum, the arc can only be supported by the actual volatilization of the true element carbon, that is the metal. As the temperature of volatilization of the metal carbon is much higher than that of the carbon sub-compounds, the temperature of the electric arc between such metal carbon electrodes in a vacuum or in a pure and dry gas that is practically inert to carbon (for example, argon), is probably much higher than the temperature of an ordinary arc and higher than the fusing point of the true element, metallic carbon. Various experiments which I have made point to the truth of these conclusions.

From these premises it follows that in order to weld the essentially porous structure of the pressed-up rod of metal carbon into a very dense and metallically coherent form throughout, as in the case of a rod of copper or aluminum for example, it is necessary to secure a sufficiently high temperature under proper conditions to completely fuse the metal carbon in mass, or at least to cause the opposed faces of any voids or faults of the structure to adhere together in a true metallic union. As welding can be effected at a lower temperature than that required for complete fusion, particularly with the aid of mechanical pressure, and because pressure or working combined with high temperature and vacuum serve to eliminate bubbles and work out gases and other impurities from the rod, welding has been adopted in this particular apparatus. I intend, however, to file other applications covering complete fusion of the metal carbon for securing the desired dense and metallically coherent structure preparatory to mechanical working, and also covering other means of securing such dense and metallically coherent structure.

The required high temperature for welding the pressed-up metal carbon in a vacuum or non-injurious atmosphere can be secured by passing a sufficiently heavy current from a metal carbon roll transversely across the strip or rod to be welded, to another roll of metallic carbon, and arranging for proper pressure to be applied by the rolls so as to follow up the metal as it becomes condensed, freed from gases, and welded, thereby avoiding destructive arcing. For the reasons set forth in paragraphs numbered 1, 2, 3, 7 and 10 supra, welding of the structure of the metal carbon may be secured by such electric welding or equivalent means, and has been secured in slight masses. By rolling the rod back and forth a number of times, the entire structure can be thoroughly welded, and at the same time a proper working and elongation of the structure secured, together with elimination of any slight remaining gas or impurities and an increase in tensile strength.

It may under some conditions be found expedient, especially in a commercial process, not to depend upon securing the heating effect solely by the passage of electric current from one roll transversely through the rod or other body to the other roll, but to give the same a preliminary heating before passing it to the rolls from either direction. This pre-heating may be sufficient to obviate the necessity of heating the rod by the passage of current from the rolls, though I consider it desirable to provide such means so that the best welding temperature may be secured at the moment the rod or other body passes between the rolls, and also to provide a means for securing and controlling the proper temperature for the rolls. The required pre-heating of the rod or body can be secured by passing it from a pre-heating tube of metallic carbon heated by the passage of an electric current, before the rod enters between the rolls from either direction. The required high temperature of this pre-heating tube can be secured for reasons explained in paragraph numbered 7 supra, by providing means for reducing the energy losses so that the current density in the pre-heating tube will be kept below the critical point, at which incipient arcing would otherwise start in the interior of the structure to such a degree as to unduly shorten the life of the pre-heating tube at that particular temperature.

It is desirable, especially when the operations are conducted in a vacuum, to surround the pre-heating tube with a reflector tube of metallic carbon. The radiant energy which at such high temperatures is the greater part of the energy losses, is largely reduced through reflection back to the pre-heating tube by the reflector tube, on the same principle as in the well-known "thermos bottle". There being a vacuum between the tubes, convection losses are practically eliminated. Heat conduction losses are reduced to a minimum by making the tubes of sufficient length and by properly proportioning their cross sections. An electric current is preferably passed through the reflector tube as well as through the pre-heating tube in order to maintain the temperature of the reflector tube at as high a point as possible, and also to maintain a higher temperature of the pre-heating tube without microscopic or incipient arcing in the interior of its structure, than would otherwise be possible.

A second and concentric electrically heated reflector tube may surround the first, and this arrangement makes it practicable to run the first reflector tube and the pre-heating tube at higher temperatures respectively than could otherwise safely be maintained. Any desired number of reflector tubes may be used, the total number being dependent fundamentally on the degree of metallic coherency of the metal carbon used for the tubes, and the temperatures desired to be given by the innermost pre-heating tube to the rod as it passes to the rolls to be welded and worked. The number of tubes used will further depend upon the cost of the electric energy employed. Electric heating may be applied to any one or more of the tubes used, this being a matter of design and construction of the apparatus, depending upon various conditions which it may be desired to meet. However, in the drawings I show all of the tubes with means for heating them electrically. If the outermost reflector tube be run at a temperature of, say, 1,000° C., the total radiant losses will not be great notwithstanding the relatively large radiating surface of this tube. As very high temperatures are required only during the actual welding operation, and as the time of such welding operation may, with proper practice, be quite short, the cost for electric energy for this purpose will not be excessive.

The pre-heating and reflector tubes can be run at extremely high temperatures for a reasonable life for reasons given in paragraphs numbered 1, 3, 7 and 10 supra. I propose ultimately to use pre-heating and reflector tubes of metallic carbon having a thoroughly dense and metallically coherent structure throughout. The sheet for such tubes will be secured by the apparatus described herein, but until such tubes be produced it will be necessary to use tubes with merely the pressed-up structure or the equivalent. The same observation is true with respect to the metal carbon rolls and the bearing linings used in the apparatus. When material having a dense and metallically coherent structure throughout shall be available, the number of reflecting tubes may be reduced, and it will then be possible to operate with only the pre-heating tube if the cost due to high energy losses may be ignored; that is, it is practicable to heat the rod to a welding temperature, which temperature partly depends upon the pressure to be effected by the rolls, through the use of the pre-heating tube alone. After the rod has left the pre-heating tube, if any adjustment of the temperature be required, it may be secured by passing a current of proper degree through said rod from one roll to the other. Temperature and pressure should of course be properly correlated.

In order to make the principles involved still clearer, it may be stated that if a rod or other body of the metal carbon be given a dense, thoroughly welded structure throughout and be suitably supported in a vacuum or inert gas, and electrically heated by the passage of an electric current through the rod, the incipient or microscopic arcing in the interior of the structure will not occur, because of the perfectly metallically coherent structure throughout, notwithstanding the high losses from radiant energy and the resulting high current density required in the rod. With such a rod parting occurs only through fusion in considerable mass at the point of rupture, as in the case of a rod of copper, iron or tungsten, for example.

The fusion of the true element carbon in metal form in large mass under such conditions is therefore not a difficult thing to accomplish intrinsically. The important requirement is to have a completely coherent metallic structure. I have already fused metallic carbon in small mass under proper conditions, as demonstrated by specimens exhibited in connection with my aforesaid application Serial No. 462,965. Fusion of the true and free element carbon, that is, the metal carbon, in considerable mass, merely depends upon having a thoroughly metallically coherent structure, and subjecting it to a sufficiently high temperature in a non-injurious atmosphere or medium. The fusion effects are hence generally similar to those of well-known metals. Where such thoroughly metallically coherent structure is not present, fusion will depend upon limiting the energy losses, so that fusion will occur before the structure is destroyed by incipient arcing in the interior due to the passage of electric current and to imperfections in the structure. Contrary to the generally accepted theory, volatility or the quality of sublimating, does not enter to a material extent into the matter of fusion of the true and free element carbon in metal form, that is in respect to its surface and before the point of internal incipient or microscopic arcing has been reached.

In practice it is deemed preferable to employ a vacuum as nearly complete as possible, for the reason that absence of material pressure in the surrounding medium facilitates escape or withdrawal of gases from the body under treatment. As is well known there will, however, even where air is exhausted to a very high degree from a space or chamber, inevitably be some gas or gases remaining. The present invention contemplates operation in a medium or atmosphere having no injurious effect upon the substance under treatment, and employment of an inert gas, or a gas having a beneficial effect upon the particular substance under treatment, is within the scope and spirit of my invention. In other words, while a vacuum or a high degree of exhaustion is preferred, the invention may also be carried out by, and the claims are to be understood as comprehending, operation in a gas, an atmosphere, or a medium practically incapable of exerting an injurious effect upon the substance treated. The terms vacuum, gas, atmosphere and medium as used in this specification and the appended claims, are hence to be read with this understanding.

With this preliminary explanation to make clear the underlying principles and theories, I will now describe in detail the preferred form of apparatus for hot welding and hot rolling the intrinsically porous metallic carbon into a dense metallically coherent structure throughout, with the gases and impurities eliminated, reference being had to the accompanying drawings in which:

Figure 1:
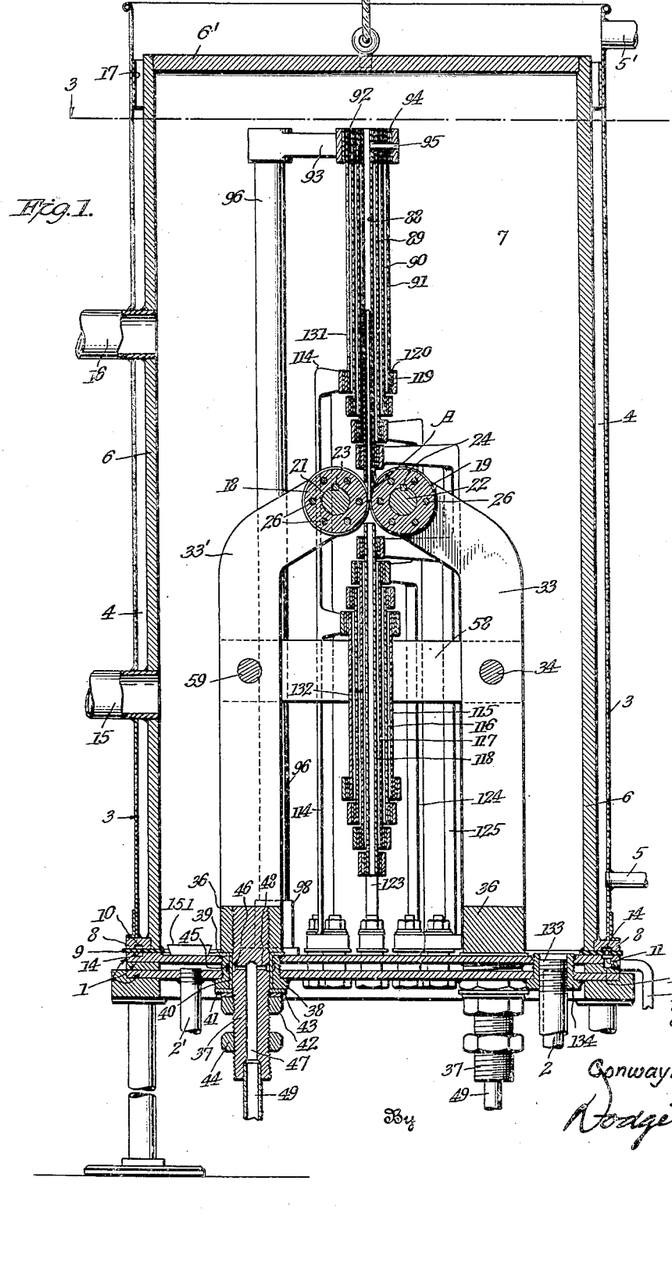
Figure 1 is a longitudinal sectional view of the apparatus on the line 1—1 of Fig. 3 looking in the direction of the arrows, the structure being here shown in its preferred upright position.

Referring to Fig. 1, the numeral 1 designates the hollow base of the apparatus formed of two plates and an intermediate flat spacing ring, the circumference of which is coincident with that of the plates. The three members may be united in any convenient way as by rivets and soldering. This base is suitably supported and provided with pipes 2 and 2' to permit circulation of water or other cooling medium through the space between said plates. Resting upon said base is a cylindrical housing, preferably comprising an outer shell 3 and an inner shell 6 closed at the top by a plate 6'. Shell 6 is concentric with but spaced from shell 3, thus leaving an intermediate space 4 into which water or other cooling medium is delivered through a pipe 5 near the base of the housing. A second pipe 5' near the top of the housing permits escape of the used cooling medium. The inner shell is preferably constructed of copper or brass sufficiently heavy to withstand atmospheric pressure or above, but the outer shell 3 may be of lighter construction and of any suitable metal, as it is only necessary that this exterior portion should withstand the pressure of the cooling agent. The base and the housing thus jointly enclose a hermetically sealed chamber 7 within which is placed the hot welding and rolling apparatus.

The inner and outer shells of the housing are connected at their lower ends by a flat ring 8, preferably of copper or brass, said ring being secured to said shells by solder or the like. For the purpose of making the joint vacuum tight, a rubber or other suitable gasket 9 is interposed between base 1, ring 8 and the inner shell 6. In order to prevent leakage of air from the outside to the interior of the apparatus at this point, a vacuum seal is provided. This consists of an annular groove 10 in the face of ring 8 and a similar groove 11 below groove 10 and gasket 9, said grooves communicating by a passage 12 with a pipe 13 leading to an exhaust system (not shown), which is provided for this and other vacuum seals of the apparatus. Communication between the upper groove 10 and the lower groove 11 is afforded by openings 14 placed at suitable intervals through the gasket 9.

It is desirable to have all grooves, openings, and pipe connections for the vacuum seals and exhaust system as large as practicable; for example, pipe 13 should preferably be not less than one-half inch inside diameter. It is also desirable to maintain such a high vacuum on all the vacuum seals used throughout the apparatus, that any leakage which takes place will be from the interior of the apparatus out, for example, past gasket 9 to the annular grooves 10 and 11 thereof. Air from the outside will thus be effectually prevented from reaching the interior of chamber 7 of the apparatus.

The apparatus is provided with suitable peep tubes, the lower one, 15, passing through and being supported by the inner and outer shells of the housing, and secured by soldering or welding to form water and vacuum tight connections, as indicated. Peep tube 15 preferably bears on the approximate center of the innermost preheating tube of the lower set. The upper peep tube 16 is constructed and supported in like manner and may bear on any part of the innermost tube of the upper set of preheating tubes, but preferably on the part which gives the best indication of the temperature of the rod A just previous to passing it between the rolls. All peep tubes used in the apparatus are closed at the outer end by a transparent eye-piece such as glass, or preferably, clear quartz, suitably supported and sealed vacuum tight.

17 designates a band of metal preferably riveted and soldered to the outer shell 3 of the housing, to reinforce said shell at the upper portion.

Figure 6:
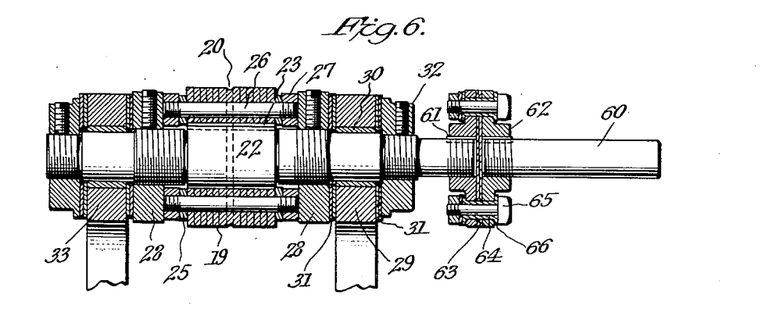
Figure 6 is a detail view of one of the rolls, partly in section, with its shaft, bearings, and coupling to the horizontal driving shaft.

18 and 19 designate a pair of rolls spaced slightly apart so that they do not actually touch, the detailed construction of the rolls used in this embodiment of the invention being shown in Fig. 6. Each roll is furnished with a groove 20 of slightly shorter radius than the rod A to be rolled, to give the desired reduction for this particular pass. Roll 18 is mounted on and driven by shaft 21 and roll 19 is mounted on and driven by shaft 22 by means of the keys 23 and 24 respectively (Fig. 1). On each side of each roll is located a plate 25 which serves to support the relatively soft material of the rolls, said plates being held together and against the respective sides of the rolls by means of through studs 26 furnished at each end with a nut 27, which when screwed up hard strongly compress and hold the structure of the roll.

Owing to the high temperatures employed it has been found advisable to construct rolls 18, 19 of the metal carbon in the following manner: The metal carbon sponge is pressed up into relatively thin washers by means of a steel mold with plunger, operated by hydraulic pressure. These washers are then drilled to receive the studs 26, and are assembled on the shaft and securely clamped together by means of plates 25, studs 26 and nuts 27. The face of the roll is then turned off true and the groove 20 is formed. The exposed faces of the nuts 27 are also faced off true, and round nuts 28 screwed home against nuts 27 through recesses not shown, by means of a spanner wrench, thus supporting the same and the studs 26 and more securely clamping the parts together. Each nut 28 is furnished with a set-screw to prevent loosening of said nut after it has been screwed up tight.

As rolls 18, 19 must run at an unusually high temperature, particularly when welding the structure of the metal carbon rod A or other body, the shafts and keys of said rolls as well as studs 26, plates 25, and nuts 27 and 28 should be of a metal or alloy to withstand their respective temperatures without yielding to an undue extent. Such metals or alloys are tungsten, molybdenum, tungsten steel and "steelite". As the nuts 28 will run cooler than the other parts of the rolls, they may be formed of a metal or alloy with a lower softening temperature than the other parts.

One end of shaft 22 of roll 19 is supported by a bearing 29 formed integral with its vertical support, said support extending to and mounted upon base 1. (See Figs. 1, 2, 3, and 6.) This bearing support 29 is provided with a bushing 30, preferably of metal carbon to prevent sticking or galling of said shaft and permit the same to run without lubricant. If desired, this bushing may be formed of two concentric sleeves, to guard against any difficulty from possible sticking to the shaft. On each side of bearing support 29 are placed two washers 31, the four washers being preferably formed of metal carbon. The purpose of washers 31 is to carry current from bearing support 29 into the circular nuts 28 and an outside nut 32. Two washers 31 are used on each side of the bearing support for the reason that they are liable to stick against the metal of said bearing support or that of circular nuts 28 and 32. With this construction the inner surfaces of the washers which are in contact will not stick, as the metal carbon of which they are formed will not weld except at very high temperatures. Extremely heavy electrical currents may therefore be passed from the stationary bearing support 29 to the circular nuts 28 and 32 without causing arcing, burning or sticking of the parts. The circular nut 32 also serves to adjust the pressure and degree of contact between the washers 31 and the parts against which they lie. This nut may be set up carefully against the outer pair of washers 31 and then secured by set-screw so that the proper degree of electrical contact may be secured and the roll placed and maintained in its proper position horizontally. Any further adjustment may be secured by varying the thickness or number of washers 31, or by also using a metal washer of proper thickness against the nut.

The other end of shaft 22 is similarly supported by a bearing 33 identical with the bearing support 29, and is likewise provided with similar bushing, contact and spacing washers, and adjusting nut. Owing to the relative softness of the metal carbon bushing 30, ample bearing surface should be provided. The bearing supports 29' and 33' of roll 18 are identical in construction and mounting with the bearing supports 29 and 33 of roll 19.

Figure 2:
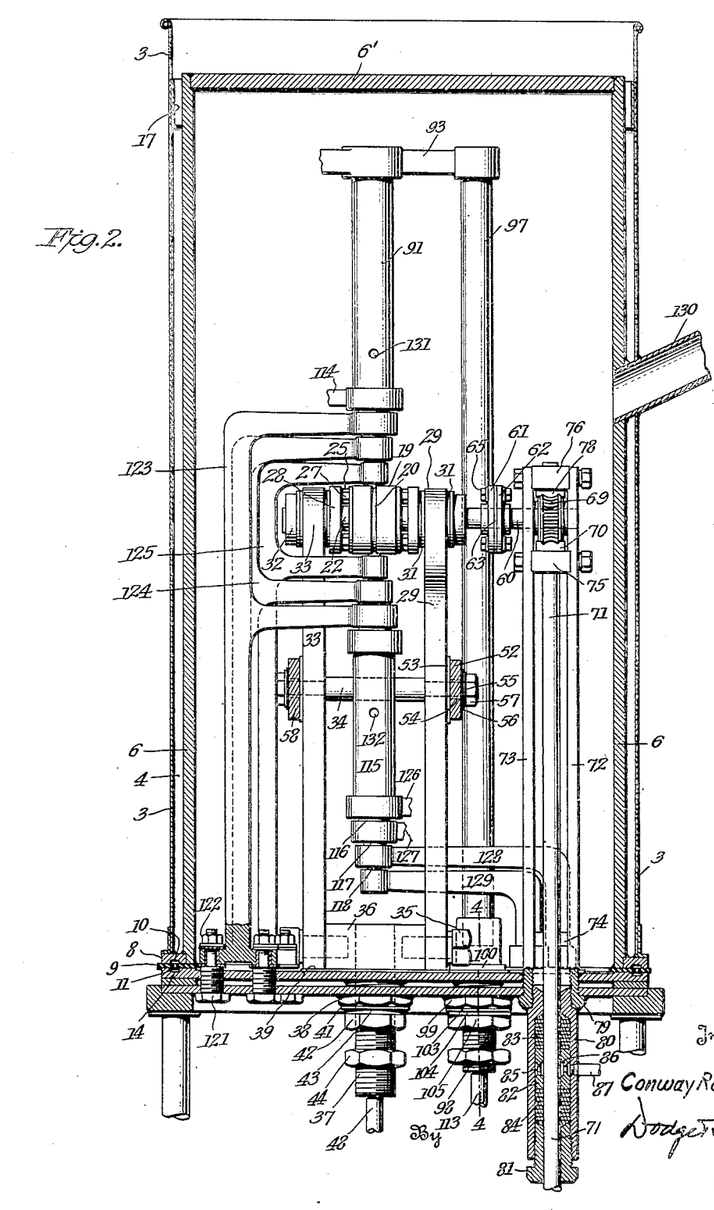
Figure 2 is a partly sectional view on the line 2—2 of Fig. 3 looking in the direction of the arrows, and showing the means for driving the rolls.
Figure 3:
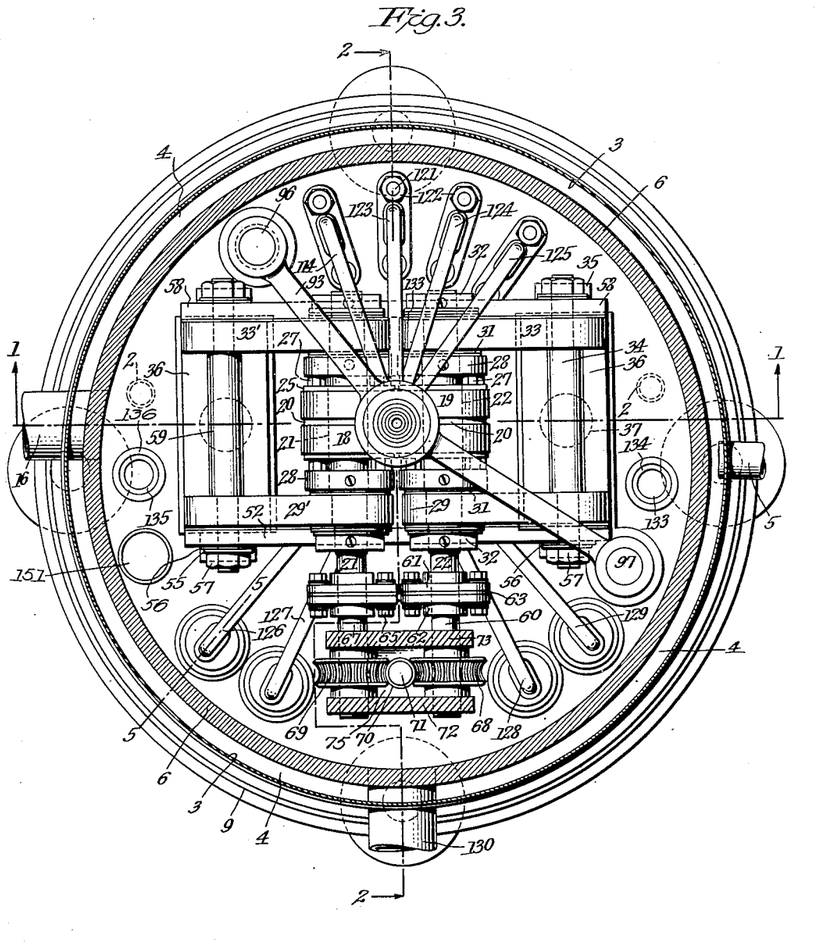
Figure 3 is a top plan view on the line 3—3 of Fig. 1.

Referring to Figs. 2 and 3, it will be seen that the two bearing supports 29 and 33 for roll 19 are spaced apart by a shouldered stud 34 passing through said supports and through connecting plates later described. The lower ends of the four bearing supports for the rolls are secured in pairs by suitable bolts 35 to a base block 36 lying between them and resting upon the base 1 of the apparatus. Block 36 is drilled and tapped to receive a copper stud 37, which is of sufficient length to pass through base 1 to the outside thereof, and has suitable electrical connection made with it. Stud 37 passes through a metal bushing 38 provided with a head, said bushing being screwed home through both walls of base 1 (see Fig. 1). Block 36 and the lower ends of the bearing supports 29' and 33' are insulated from base 1 by a mica plate 39. Stud 37 is insulated from bushing 38 by a bushing 40 and washer 41, both preferably formed of mica. A nut 42 with a metal washer 43 between it and mica washer 41 is screwed on the threaded portion of stud 37, and serves to draw base block 36 with bearing supports 29' and 33' secured to it, firmly down upon mica plate 39, thus holding the structure properly in place. Nut 42 should preferably be furnished with a set-screw (not shown) to prevent it from loosening. Another nut 44 is screwed upon stud 37 for the purpose of clamping a suitable electrical connection between it and nut 42.

Wherever an unsoldered or unwelded joint leading to the interior of the apparatus is used, it is important to provide it with a vacuum seal, and all permanent joints should be soldered or welded so that they will be vacuum tight, and the materials used should in themselves be sufficiently tight. A vacuum seal is provided for stud 37 and constructed upon the same principle as already described in connection with gasket 9, but differing slightly to suit the special conditions at this point. The metal bushing 38 is provided with an annular recess 45 (Fig. 1), a similar recess 46 being provided in stud 37 opposite recess 45. Stud 37 has an axial passage 47 drilled from its lower end to a little beyond recess 46, and one or more small radial holes 48 connect recess 46 with said passage. The insulating mica bushing 40 is likewise provided with one or more holes (not shown), which connect annular recess 45 with recess 46.

The lower end of stud 37 is provided with a pipe 49 which is connected with the general vacuum seal exhaust system. Any leakage which may occur through the metal bushing 38 and along stud 37, on either side of mica bushing 40, will be caught by annular recesses or grooves 45, 46 respectively, and drawn out through the small holes in bushing 40, the radial holes 48, and passage 47, to vacuum exhaust pipe 49. As the vacuum in the vacuum seal exhaust system is normally higher than that within chamber 7, any leakage with respect to the latter will occur from the interior of said chamber outward to the vacuum exhaust system, and thus leakage of air from the outside into chamber 7 is prevented.

Bearing support 29 of roll 19 is tied to bearing support 29' of roll 18 by means of plate 52 secured by the shouldered stud 34. The end of plate 52 is insulated from bearing support 29 by a mica washer 53 and from the end of stud 34 by a mica bushing 54 (see Fig. 2). Plate 52 is further insulated from metal washer 55 by a mica washer 56. A nut 57 is screwed on the threaded portion of stud 34, and when screwed home serves to secure plate 52 to bearing support 29. The other end of said plate 52 is similarly secured to bearing support 29' by a stud 59 and insulated in a similar manner. A similar tie plate 58 is provided to connect bearing supports 33 and 33' by means of the studs 34 and 59 previously mentioned, said plate being insulated as above described in connection with plate 52.

As seen in Fig. 6, shaft 22 of roll 19 is connected with a horizontal driving shaft 60 by means of an insulated coupling comprising two flanges 61, 62, the former keyed to shaft 22 and the latter to shaft 60. These two flanges are spaced apart by an insulating washer 63, and are further insulated by a mica bushing 64 around the body of each of the bolts 65 which clamp flanges 61 and 62 together. Mica washers 66 are placed under the heads of bolts 65 and under the metal washers beneath the nuts of said bolts. This insulated coupling prevents the electric current which is fed into bearing supports 29 and 33 from short circuiting across to bearing supports 29' and 33' of roll 18. This, with the other insulations already described prevents any short circuiting of the current and compels its passage to and through rolls 18, 19 and the interposed rod A. Shaft 21 of roll 18 is similarly connected with a horizontal driving shaft 67 by means of a coupling identical with that just described for shaft 60, said couplings further serving to insulate shafts 60 and 67 from the high temperature of roll shafts 21 and 22. (See Fig. 3).

As seen in Figs. 2 and 3 a suitable worm wheel 68 is keyed to shaft 60 and an identical worm wheel 69 is keyed to shaft 67. These two worm wheels are driven by a vertical worm 70 placed between and arranged to suitably engage them. Worm 70 is keyed to a vertical driving shaft 71 which passes out through base 1 of the apparatus by means of a vacuum-tight gland later described. The horizontal driving shafts, worm wheel, worm and vertical driving shaft are supported as follows:

As seen in Fig. 2, two vertical plates 72 and 73 are connected at their lower ends by a bearing block 74, with suitable means (not shown) for securing them rigidly together. This bearing block 74 serves as the lower bearing of vertical driving shaft 71, and is suitably secured to base 1. The vertical plates 72, 73 are connected at their upper portions by bearing blocks 75, 76. These last-named bearing blocks form the upper bearings for vertical drive shaft 71 and are suitably secured to plates 72, 73. Said plates are provided with openings serving as bearings for the horizontal drive shafts 60 and 67. 77 and 78 designate loose washers which take the thrust in either direction of the hub of worm-wheel 70. Shaft 71 is driven by any suitable means, at a speed which will give the desired speed for rolls 18, 19, and said shaft may be reversed either by hand or automatically so as to roll the rod A up and down between said rolls, as later explained.

As previously mentioned, shaft 71 extends to the outside of the apparatus through a special vacuum-tight gland which will now be described. A metal bushing 79 is screwed through the upper and lower plates of base 1 to receive a gland body 80 of cylindrical construction, said body being screwed into bushing 79. The upper portion of gland body 80 is drilled longitudinally to neatly fit drive shaft 71, but it is better practice not to use it as a bearing surface. The lower end of gland body 80 is tapped to receive a threaded follower plug 81 which is drilled to allow drive shaft 71 to pass through it, and is preferably provided with a polygonal head so that it may be screwed in and the gland tightened thereby by means of a wrench. It is important to have this gland vacuum-tight, and I have found that this may be satisfactorily accomplished as follows:

A loose fitting cylindrical body 82 is placed between two series of thin packing washers 83, 84 of metal carbon, lying respectively above and below said body 82. Upon tightening plug 81, the body 82 and the washers 83, 84 above and below same are forced solidly home in the gland body 80, and the washers are compressed until they fit tightly against the internal walls of said body 80 and around drive shaft 71. The washers 83 and 84 being of metal carbon do not require any lubricant, and shaft 71 will accordingly run in close contact therewith without undue friction, and the gland will be practically vacuum-tight. To guard against leakage of air through the gland to the interior of the apparatus, the cylindrical body 82 is provided with two annular grooves 85, 86, the former on its outside surface and the latter on its interior surface, said grooves being opposite each other and connected at suitable intervals with holes drilled radially. The total depth of the metallic carbon washers 83, 84, when compressed, is such that the body 82 will take a position in gland body 80 which will bring annular groove 85 opposite a pipe 87 connected with the vacuum seal exhaust system.

By this arrangement any air leaking in along the internal walls of gland body 80, or inwardly around the vertical drive shaft 71, will be caught by the respective annular grooves 85, 86 and drawn out through exhaust pipe 87. As a higher vacuum should be maintained on the vacuum seal exhaust system than in the interior of the apparatus, there will be no leakage inwardly through the gland, but there may be a slight leakage of the gases within the apparatus outwardly through the gland to the annular grooves 85, 86 respectively, and thence to the vacuum exhaust system through pipe 87.

The preheating and reflector tubes, now to be described, may be produced by deposition of the original compound on a graphite tube of the desired diameter, this operation being carried out in the primary furnace, as described in my aforesaid application Serial No. 462,965. The graphite tube with its deposit will then be fired in the secondary furnace, as also described in said application, the deposit thus being reduced to metallic carbon. The metallic carbon sponge so produced may then be condensed by pressure in a steel mold of suitable size and shape. The graphite tube may then be removed by boring it out in a lathe, or the metal carbon tube may be cut off from the graphite tube by means of a thin steel tube, the inner bore of which will be slightly larger than the outside diameter of the graphite tube, the steel tube being revolved in the chuck of a lathe and used as a cutting tool to remove the metal carbon tube from the graphite tube.

Referring to Figs. 1 and 2, it will be seen that a set of preheating tubes is placed above rolls 18, 19, while a generally similar set is placed below said rolls. Referring first to the upper set, four metallic carbon tubes, arranged concentrically, have been shown, though a greater or less number of tubes may be used depending upon the temperature desired for the innermost tube, and the quality of the structure of the metallic carbon used for the tubes, as already explained. Until metallic carbon tubes with a thoroughly welded structure are available, it will probably be desirable to use at least seven or more tubes so that the current passed may be properly graduated to suit the cross section and structure of the tubes, and at the same time attain the requisite temperature.

The rod A to be rolled is placed within the innermost tube 88 (Fig. 1), which serves to directly heat said rod. This tube is surrounded by the first reflector tube 89, which in turn is surrounded by the second reflector tube 90, said tube 90 being surrounded by the outermost reflector tube 91. The tubes should be straight and true, the reflecting surfaces smooth, and the space between each tube should be as small as practicable. As the operation is preferably conducted in a vacuum, there are no material energy losses by convection, and the radiant losses from one tube to the next outward tube are greatly limited, due to the fact that the next outer tube reflects a large part of the radiant energy back to its immediate source. By operating in a vacuum and using a plurality of reflector tubes, excessive energy losses are prevented, although some losses to the supports by heat conduction will of course occur. These can be reduced by making the tubes of proper length and reducing their cross section.

Each tube is supplied with current through an independent branch or circuit having its individual means of control, and thus the appropriate relative temperatures may be secured and maintained. With this object in view the tubes 88, 89, 90 and 91 are assembled with their upper ends flush, and with a metal carbon bushing or sleeve 92 interposed at the upper ends of each two adjacent tubes, and a similar sleeve around the outermost tube 91. There are four of these sleeves in the construction shown, all serving the same purpose, but each of a different diameter from the others. Between the metallic carbon sleeve 92, which surrounds the outermost tube 91, and a horizontal metal support 93, is placed a sleeve 94. This sleeve should be of a refractory metal such as tungsten or molybdenum, or a refractory alloy, and its purpose is to interpose at this point a material which will withstand the high temperature of the metallic carbon sleeve 92 adjacent said sleeve 94. The support 93 should preferably be formed of a metal of fairly high electric conductivity, as for example, an alloy of copper and tin. Such an alloy has a relatively low fusing point, and if brought directly against the metallic carbon sleeve 92 which is naturally very hot because of its high heat conductivity, injury to the support might occur. The refractory metal sleeve 94 should be of sufficient thickness and suitably designed to give the required temperature gradient between the metal carbon sleeve 92 and its support 93.

The upper ends of tubes 88, 89, 90 and 91 and their respective sleeves 92 should preferably be cemented together when assembling them, using a cement made of fine commercial graphite and a suitable binder such as sugar solution or gum arabic. It is advisable also to secure the tubes and sleeves 92, when assembled, to the sleeve 94 and support 93 by one or more pins 95, preferably of tungsten, said pins passing horizontally through from the outside surface of support 93 to the internal surface of tube 88, but not beyond said last-mentioned surface, as space must be allowed for insertion of the rod A or other body into the tube 88. In Fig. 1 one pin is shown for convenience of illustration, but in practice about three pins placed about 120° apart will preferably be used.

The cross support 93 is carried by vertical supports 96, 97 (Figs. 1, 2 and 3), the lower end of support 96 being mounted in a copper stud 98 (Fig. 4) which passes through a metal bushing 99 screwed through both plates of base 1. A metal washer 100, preferably of steel, is placed under the head of stud 98, and beneath said metal washer is placed a mica washer 101. A mica bushing 102 surrounds the body of stud 98 where it passes through bushing 99. The mica bushing 102 rests upon a mica washer 103 placed against the lower face of bushing 99, said washer 103 bearing upon a metal washer 104. A nut 105 is screwed on the threaded lower portion of stud 98 and serves to draw the head of said stud against the metal washer 100, thus compressing the mica washers 101 and 103 and forming a tight joint which holds the parts securely in place. Nut 105 should be furnished with a set-screw (not shown) to prevent its loosening. The terminal 106 which is to receive the electrical connection, is placed between nut 105 and a nut 107, said nuts clamping and holding said terminal securely and ensuring good electrical contact.

Figure 4:
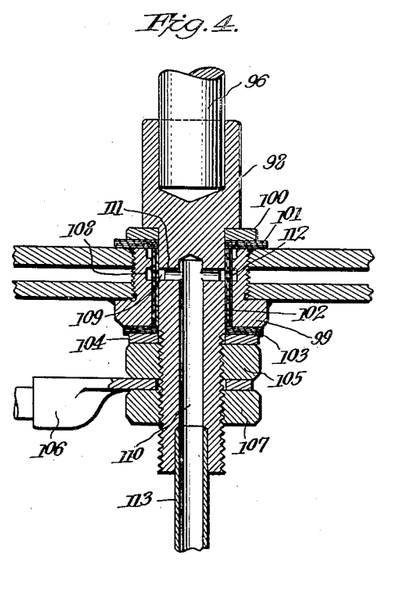
Figure 4 is a detail sectional view on the line 4—4 of Fig. 2, of one of the two studs for making electrical connection with the upper support of the upper set of pre-heating tubes.

Bushing 99 is provided with an annular groove 108 formed about midway of its length, and stud 98 is likewise provided with an annular groove 109 formed in the portion of its shank opposite groove 108 in bushing 99. A central longitudinal opening 110 is drilled into stud 98 to and a little beyond groove 109 and communicates with said groove by a series of small holes 111 drilled radially, a series of small holes 112 being drilled through the mica bushing 102 to afford communication between grooves 108 and 109. A pipe 113 is soldered into the lower end of the opening 110 in stud 98, which may be counter-bored for the purpose, if desired, said pipe being connected with the general vacuum seal exhaust system. As previously explained, any slight leakage of air which might otherwise occur from the outside to the interior of the apparatus, is caught by the annular grooves 108, 109, and is carried through holes 111 and 112 to the longitudinal opening 110 and thus into the vacuum seal exhaust system.

The vertical support 97 (Figs. 2 and 3) is provided with a stud similar to stud 98 of support 96, said stud being mounted, insulated, and provided with electrical and vacuum exhaust connections similar to those described for stud 98. The supports 96, 97 are connected in parallel to the electric circuit used for heating the upper and lower sets of preheating tubes, and thus together supply current to the upper ends of the tubes of the upper set.

The lower end of the outermost reflector tube 91 of the upper set is supported by the upper arm of a two-armed bracket 114, through which electric current is passed from tube 91 to the upper end of tube 115 of the lower set, said bracket extending to and being mounted upon the base 1 but insulated therefrom as presently described. The lower arm of bracket 114 supports and makes electrical connection with the outermost reflector tube 115 of the lower set. The next reflector tube of the lower set, from the outside, is designated by numeral 116; the next tube, that is the third including the outside tube, being designated by numeral 117; while the innermost tube, which in both the upper and lower sets actually serves to directly heat the rod A which is to be welded and rolled, is designated by numeral 118. The end of the upper arm of bracket 114 is shaped as a cylindrical ring to surround and hold the lower end of the outermost tube 91 of the upper set. This ring portion of the bracket arm is supplied with a bushing 120 of a refractory metal or alloy such as tungsten, molybdenum or tungsten steel, and fitting closely within said ring is a second bushing 119 of metallic carbon which closely surrounds and fits the lower end of tube 91. This construction is generally similar to that described for connecting the upper ends of tubes 88, 89, 90 and 91 with the cross support 93, the graphite cement and tungsten pins similar to the pins 95 of the upper connection being likewise used and for the same purpose. The lower arm of bracket 114 is of similar construction, and is electrically connected with and supports the upper end of the outermost tube 115 of the lower set in the manner just described for the lower end of the outermost tube 91 of the upper set.

Bracket 114 terminates at its lower end in a foot-piece as shown in section in Fig. 2 in connection with the supporting bracket for tube 90, said foot-piece being secured by two shouldered studs 121 on either side thereof. These studs are screwed through both plates of base 1, the upper portions thereof being reduced in diameter while the lower portions are threaded. These reduced portions pass through suitable openings in said foot-piece, and are insulated therefrom by mica washers and bushings in the same manner as other studs used in the apparatus. Nuts 122 with suitable metal washers beneath the same and bearing against the mica washers immediately below, are used to hold the bracket foot-piece securely to the base.

The lower end of tube 90 of the upper set of preheating tubes is supported by and electrically connected with the upper arm of a bracket 123 (Figs. 2 and 3) identical in construction with bracket 114, the lower arm of said bracket 123 supporting and making electrical connection with the upper end of the tube 116 of the lower set of tubes. Bracket 123 is supported by and insulated from the base 1 of the apparatus in the same manner as bracket 114. Bracket 124 is similar in construction and mounting to brackets 114 and 123, the upper arm supporting and making electrical connection with the lower end of tube 89 of the upper set of preheating tubes, while the lower arm supports and makes electrical connection with the upper end of the tube 117 of the lower set of tubes. The lower end of the innermost tube 88 of the upper set of tubes is supported by and electrically connected with the upper arm of a fourth bracket 125, the lower arm of said bracket supporting and making electrical connection with the upper end of the innermost tube 118 of the lower set of preheating tubes.

It will be seen from the foregoing that the current after leaving, for example, the upper ends of the tubes of the upper set, which are cemented and pinned together and mounted upon the cross support 93, divides into four circuits, one for each of the four tubes of the upper set, and then passes by means of the respective tubes and brackets to the upper ends of the corresponding tubes of the lower set and through said tubes. The current of the circuit of which each of two corresponding tubes forms a part, then leaves the apparatus by means of brackets 126, 127, 128 and 129 respectively (Fig. 3), which are supplied with studs passing through base 1 for that purpose. The current in each of the four circuits may be independently adjusted by a rheostat, induction regulator or other suitable device. Thus a tube of the upper set and a corresponding tube of the lower set will form a pair in the same circuit, and may be run at approximately the same temperature. The temperature for each pair of tubes may be adjusted in proper relation, as will be further explained later.

Figure 5:
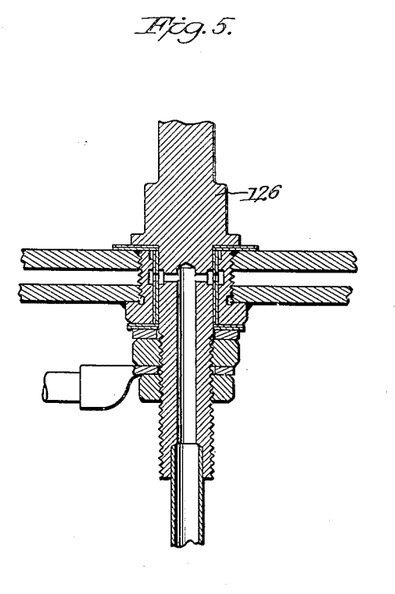
Figure 5 is a detail sectional view on the line 5—5 of Fig. 3, of one of the four studs for making electrical connection with the lower supports of the lower set of pre-heating tubes.

Brackets 126, 127, 128 and 129 are all of the same general design and construction, the only practical difference being the height of the vertical portions of the brackets and the lengths of the horizontal arms, which of course are adapted to the particular tube of the lower set which each of said brackets is to electrically connect and support. The lower portion of bracket 126, which is typical of all four, is shown in Fig. 5, and is formed with a threaded stud portion mounted in a mica bushing within a metal bushing screwed through the plates of base 1, and supplied with insulation, connections to the general vacuum seal exhaust system, and electrical connection, similar to those illustrated in Fig. 4 and described for stud 98. For this reason it seems unnecessary to again describe this construction in detail.

The horizontal arm of bracket 126 connects with and supports the lower end of the outermost tube 115 of the lower set of heating tubes, while the horizontal arm of bracket 127 is connected with and supports tube 116 of said lower set. The horizontal arm of bracket 128 connects with and supports the lower end of tube 117 of the lower set of heating tubes, the horizontal arm of bracket 129 connecting and supporting the innermost tube 118 of said lower set.

In Fig. 2 there is shown a peep tube 130, similar to peep tubes 15 and 16 of Fig. 1. Tube 130 extends through shells 3 and 6 of the housing at a convenient point, and at such an angle from the horizontal that the point of first contact of rod A with rolls 18, 19 may be observed, and an accurate reading of the temperature at that point ascertained by means of an optical pyrometer, such as conventionally indicated at 152, Fig. 9. In order to take the temperature of the innermost tube 88 of the upper set, a hole 131 of about three-sixteenths of an inch in diameter is drilled radially from the outside through tubes 91, 90 and 89, and in line with the horizontal axis of peep tube 16. A similar hole 132 is drilled through the three outer tubes of the lower set of heating tubes, in line with the horizontal axis of peep tube 15. It is understood of course that an optical pyrometer such as indicated at 152 may be employed in connection with the peep tubes 15 and 16. For many purposes the color or hue of the substances under treatment will afford sufficiently accurate information to guide the operation, but for very close or accurate determination of the temperature, the pyrometer may be employed. It, however, constitutes no part of the furnace or of applicant's present invention, and hence is shown in simple conventional form.

Figures 7, 8, 9:
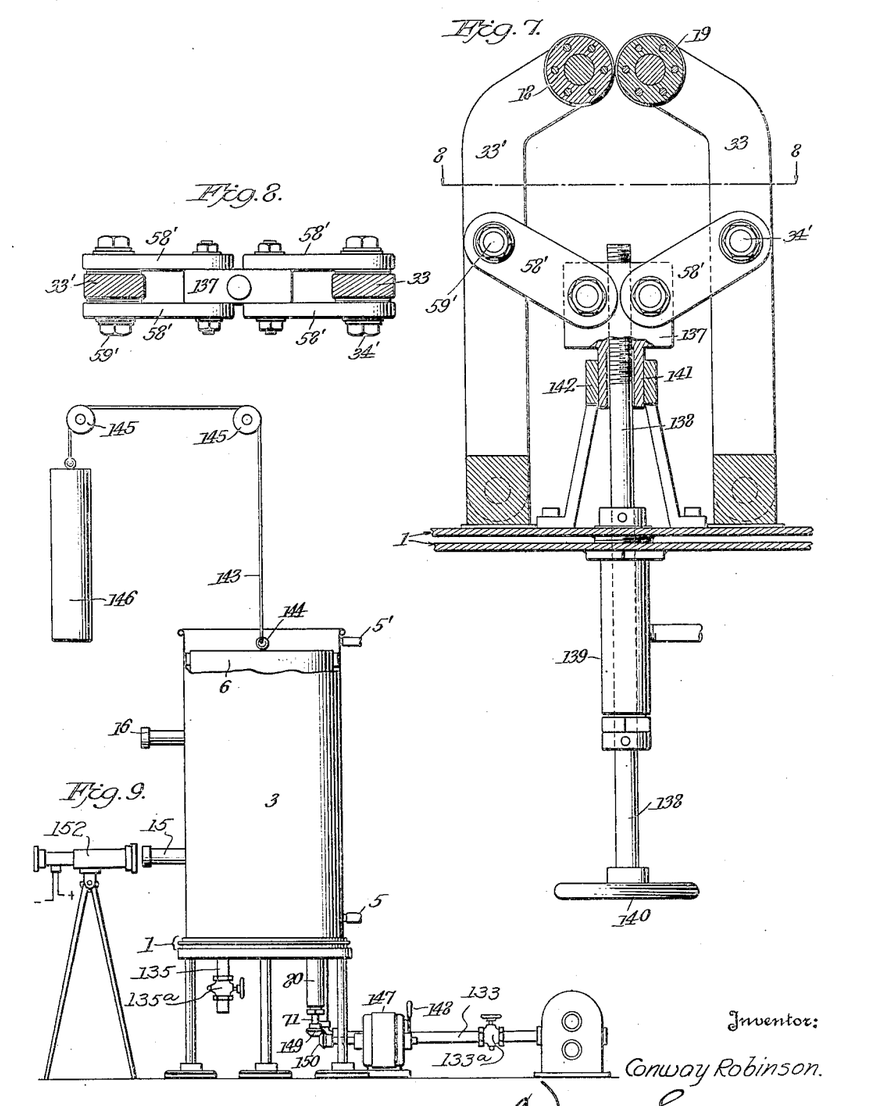
Figure 7 is a vertical sectional elevation of a modification permitting adjustment of the rolls toward and from each other.
Figure 8 is a top plan view of the same on the line 8—8 of Fig. 7.
Figure 9 is an elevation of the apparatus with the outer shell of the housing partly in section, showing the manner of counterbalancing the housing to facilitate lifting the same from the base and uncovering the apparatus therein contained, the view showing also one means of reversing the rotation of the rolls.

For the purpose of exhausting the interior of chamber 7 and the parts contained therein, a pipe 133 is provided and connected with an exhaust system preferably separate from that used for the vacuum seals. This pipe 133 is screwed in and soldered to a bushing 134 which is screwed through both plates of base 1 and gives a free passage out for the gases from within chamber 7. (See Fig. 1). A similar pipe connection 135 with bushing 136 (Fig. 3) is made to the interior of chamber 7, so that any suitable gas, such as pure and dry argon, may be passed into the apparatus for the purpose of washing it out by being withdrawn through exhaust connection 133. If connection 133 be shut off, the apparatus may be filled with any suitable gas through connection 135 and operated in that atmosphere, the gas or atmosphere most suitable to the particular metal or other substance being worked being of course selected. When it is desired to exhaust the apparatus through pipe 133, the connection 135 is shut off by a suitable vacuum tight valve 135ª (Fig. 9). A similar vacuum tight valve 133ª is provided on the exhaust connection 133, to be closed when it is desired to operate in a gas instead of a vacuum.

For the sake of simplicity and to demonstrate the principles and operation of the apparatus, I have shown only one pair of rolls and with a single pass, as illustrated in Figs. 1 to 6. When rolling strip and sheet by straight faced rolls, means such as illustrated in Figs. 7 and 8 may be provided for throwing the rolls closer together, and in this way considerable reduction in the thickness of the strip or plate may be secured.

When rolling a round rod, considerable elongation and reduction in diameter may be secured by using a plurality of apparatus such as herein set forth, each apparatus providing one pass, and each pair of rolls in the successive apparatus having grooves of progressively smaller radius. Still another arrangement is to provide one apparatus with a succession of pairs of rolls, each pair having grooves of different radius, and pass the rod downward through the successive preheating tubes to and between each pair of rolls, the desired reduction with each pair of rolls being effected before passing the rod to the next pair. Another method of operation which may be employed is to provide one pair of rolls with a sufficient number of grooves to carry the rolling to the desired extent, and arranging the preheating tubes so that they may be shifted as desired to pass the rod from one groove to another.

In Figs. 7 and 8 I have illustrated one means of adjusting the rolls toward and from each other. Under this construction the bearing supports 33, 33' for the rolls are pivotally supported at their lower ends and connected by links 58' with a block 137 tapped to receive the threaded end of a rod or shaft 138 revoluble in a vacuum-tight gland 139 carried by the base 1 of the apparatus. Rod or shaft 138 has at its outer end or below gland 139, a hand-wheel 140 by which to turn it and raise or lower block 137, said block having a portion 141 movable in a guide 142. The gland 139 through which rod 138 passes will preferably be constructed and sealed in the same manner as is the gland for shaft 71 (see Fig. 2). The links 58' should be insulated from the bearing supports 33, 33' in the same manner as are the tie plates 58 of Figs. 1 and 3. The bearing supports 29, 29', when this construction is used, will of course be arranged in the same manner as just described for the bearing supports 33, 33' and supplied with similar adjusting means, whereby the faces of the rolls may be kept parallel or thrown at a slight angle if desired, in addition to being moved toward or away from each other. If such adjusting means be used, a flexible insulated coupling should be provided in place of the rigid coupling shown in Fig. 6.

In Fig. 9 I have illustrated a simple arrangement for facilitating the uncovering of the welding and rolling apparatus and securing access to chamber 7. This involves merely a flexible cable 143, attached at one end to the housing, preferably to an eye-bolt 144 secured to the top plate of the inner shell 6, and passing about pulleys 145, the other end of cable 143 having attached to it a counterweight 146 slightly less in weight than the housing. To permit the rotation of rolls 18, 19 to be reversed at will, any convenient and usual reversing mechanism may be employed. I have, however, shown in Fig. 9 a reversible electric motor 147 provided with a reversing lever 148, and connected with the driving shaft 71 by bevel pinions 149, 150. The various studs, pipes, etc., which pass through base 1 are omitted from Fig. 9 for the sake of simplicity. Pipes 5, 5' are supplied with flexible rubber connections of suitable length, to avoid breaking the water connections when removing the housing.

In some cases it may be desirable to use a clean-up agent either in connection with a vacuum or a suitable gas, to aid in removing or in fixing any oxygen or water vapor remaining within chamber 7. This may be simply done by placing within the chamber a suitable dish as indicated at 151, Figs. 1 and 3, containing an amalgam of mercury and sodium, or a suitable receptacle may contain fused sodium, calcium, magnesium, or the like, the fusion being secured by any suitable means. Of course, when using such fused clean-up agent, care should be taken that it is solid and cool before letting air into chamber 7.

The bushings for the bearings and for the preheating tubes, when formed of metal carbon, may be produced in the same manner as the tubes, while the metal carbon washers for electrical contacts and for the gland for the driving shaft, may be produced in the same manner as the washers for the rolls.

With the apparatus constructed and arranged as above described, the operation may be as follows:

The apparatus is opened by removing the housing, and a piece to be rolled, say a round rod of metallic carbon such as the rod A that has been previously pressed up as described, is inserted in preheating tube 88, the lower end of said rod lying in the entrance to the pass between the rolls. If a clean-up agent be used, it is now introduced. The housing is then replaced, and the main exhaust and the exhaust on the vacuum seals are started. The cooling water is then turned on so that it may circulate through the water jackets of the housing and base of the apparatus.

As soon as a vacuum has been pulled in respect to the operating chamber, to about one-eighth inch of mercury or less, the current may be turned on through the preheating tubes to bring them to a dull red temperature. This will result in a considerable freeing of gases from the tubes and all parts that are heated, with a tendency to increase the vacuum pressure. The temperature may then be gradually raised and current passed through the reflector tubes as the gases are removed and the vacuum gradually improved notwithstanding the further flow of gases from the heated parts. Ordinarily, while operating, a vacuum of 40 to 50 mm. on an ordinary McLeod gage is sufficiently good, and any vacuum that may be read on said gage appears to be sufficient for operating purposes. After the vacuum has been again restored so that a reading may be taken on the McLeod gage, the rolls may be gradually heated up by passing an electric current from one to the other across the end of the rod between them. This will drive off considerable gas from the rolls, and as the vacuum is again improved, all parts may be brought gradually closer to the desired welding temperature.

The temperature of the preheating and reflector tubes should be gradually raised until the preheating tubes have reached an apparent temperature of about 2800° C., and the temperatures of the reflector tubes graduated from this point down to about 1,000° C. for the outermost tube. The rolls may then be started, and the rod or body under treatment should first be passed back and forth by reversing the rolls when the following end of the rod is nearly through the rolls, and with the hottest part of the rolls at a temperature of about 2000° C., the temperature of the body under treatment being approximately 2500° C. This initial rolling back and forth expels most of the gases and further condenses the structure. The temperature of the innermost or preheating tubes may then be gradually raised while continuing the rolling, by increasing the current through the several tubes in due proportion. The temperature of the rolls should also be gradually increased by increasing the current passing through the rolls and transversely through the piece being rolled. Care should be taken, however, that this current should not be so great as to cause arcing between the rolls and the substance under treatment, or to cause sticking or welding thereof to the rolls. The proper relative temperatures of the innermost heating tubes, the several reflector tubes, the body under treatment, and the rolls themselves, may be exactly determined by trial without special difficulty, and will depend upon the nature, size, and shape of the substances being treated, the nature and quality of the heating and reflector tubes, the shape and size of the pass, the pressure, and the speed of the rolls.

After the preliminary rolling and the heating of the preheating tubes, reflector tubes, the rod, and the rolls, to give the approximate temperature required for welding the structure of the piece being rolled, these temperatures may be further increased until the substance under treatment, if metallic carbon, has reached a temperature around or over 3300° C., as determined by an optical pyrometer, when considerable elongation of the rod and welding of the structure will have resulted. The most effective and practical welding and working temperatures, pressure, speed, and number of passes required for the substance under treatment, may be best determined by trial. These determinations are well within the ability of a person capable of operating such apparatus after a little experience has been secured.

The temperatures and other conditions should be adjusted and the rolling continued until the faces of the pores, voids or interstices of the substance under treatment have become thoroughly welded throughout, and the structure rendered sufficiently gas-free and free from any slight amount of "ash" or other impurities. A rod of metal carbon will then be found to be generally similar to a commercial rod of rolled aluminum, copper, or iron, for example. The condition and quality of the welded and rolled rod of metallic carbon may be determined from time to time by such means as microscopic examination, by determining the specific gravity and electrical conductivity, by chemical analyses, or through bending, torsion and tensile tests.

When through such examinations or by experience it has been found that the rod has reached a proper condition, it may then be rolled at lower temperatures, using harder rolls of other materials if required. Although I have not definitely determined this, the indications are that the metal carbon, after having been rolled to a considerable degree at high temperatures, may finally be rolled at room temperatures, and apparently it may be rolled without serious effect when at temperatures of about 1,000° C. and below, even in the air. After the rod has been thoroughly welded and condensed less care is necessary in respect to the vacuum, and as working temperatures are decreased, the vacuum may be of correspondingly higher pressures.

The welding of the structure may be secured either entirely by preheating the rod by means of the preheating tubes, or by means of the effect secured by passing a current transversely through the rod from one roll to the other, or by a combination of these methods. The latter is the preferred method, as the temperature of the rod and of the rolls may be better controlled by passing a current through the rolls and rod in addition to the effect from the preheating tubes. The rolls should not be allowed to become so hot that sticking or welding of the rod being rolled will occur between the rod and the rolls, as previously mentioned. The current should not be so heavy that with the pressure used, arcing, undue softening, or fusion may occur. If the point of contact of the rolls with the rolled rod be kept well below welding temperature, very little if any trouble from sticking will be experienced. The temperatures of the rolls at this point, however, like the other factors, can best be determined by trial, and the several temperatures adjusted one with the other.

The ends of the rod under treatment which may not have been completely rolled and welded due to reversing the rolls before the rod is entirely passed through, may be cut off before further rolling operations, if found necessary.

At first, metallic carbon tubes must naturally be used which have not been given a welded structure. In this case, as a general guide, it may be stated that if four tubes be used, the outermost tube might be run at about 1800° C., the next inner tube at 2500° C., the third at 3000° C., and the innermost tube at about 3300° C., for a reasonable length of time. Higher temperatures may be used as desired, but in that case the tubes, if with an unwelded structure, will naturally have a shorter life. If, due to the imperfect quality of the structure of the metallic carbon tubes, or other reasons, a sufficiently high temperature for the preheating tubes cannot be secured with an adequate life, the number of reflector tubes should be increased, and the differences in the temperatures of the preheating tubes and the two or more reflector tubes more nearly adjacent to same should be reduced, so that the temperature steps between them will be relatively inconsiderable. If the rod comes out of the preheating tube at around 3300° C., any additional temperature that may be required may be secured by passing the current from one roll through the rod to the other roll, or a higher primary temperature than 3300° C. may be used if desired, and satisfactory welding results thus obtained.

Whenever it is desired to remove the rod or substance under treatment for examination, or upon completion of the welding and rolling operations, the current is first turned off from the tubes and the rolls, and if the apparatus be operated in a vacuum, the proper valve is opened to let in the air of the room after the exhaust has been cut off; the cooling water is then shut off; and the atmospheric pressure having been relieved, the housing may be lifted by the hands, its weight being nearly, but not quite, balanced by the counterweight. The rolls may then be turned sufficiently to let the rod pass entirely through and come out through the lower heating tube 118, the lower end of which should be at a sufficient distance above the base to allow the removal of the rod without difficulty.

By mounting the metal carbon rod in a suitable vacuum chamber so that a sufficiently heavy current may be passed through it, and by surrounding it with a sufficient number of reflector tubes, generally similar to those used for the lower set of tubes in this apparatus, for example, such rod, even without the thoroughly welded structure, may be fused. This operation may be further facilitated by cutting the rod into two parts and joining them midway between the supports, so as to make a cylindrical slip joint between said parts for the purpose of localizing the heat at that point, and superimposing the temperature secured by the passage of the current across the faces that are in contact upon that which would otherwise be secured. It will be evident that such fused metallic carbon, obtained by this or some other suitable process, will be in a condition for rolling, hammering, or drawing, though in some cases there may be some gas bubbles still remaining in the structure, in which case the discontinuous places should be welded in the manner described.

All parts of the apparatus should be so designed, and constructed of suitable size and material, as not to reach an excessive temperature for such part, and the interior chamber containing the preheating and reflector tubes and the rolls should be sufficiently tight for the atmosphere employed.

When operating upon substances other than the metal carbon, it will of course be understood that the rolls and the preheating and reflector tubes may be formed of any material adapted to withstand the temperatures required for the substance under treatment.

The instructions and data given in the foregoing description are the best now known to me, and have produced, in the work thus far performed, the desired and expected results. I do not, however, mean to restrict myself to specific temperatures, pressures, degree of vacuum, speed of rolling, number of preheating and reflector tubes, or like details, here given, but contemplate such reasonable departure therefrom as further industrial development or special conditions meet with may suggest or render advisable.

Metallic carbon or the metal carbon, that is, a useful mass of atoms of the chemical element carbon without material impurity, but with a new physical structure resulting in the physical characteristics of the usual metals, is not specifically claimed herein, being reserved for and made the subject-matter of my said application Serial No. 462,965.

The art or process herein set forth and the resultant products, are not herein claimed, but form the subject-matter of and are reserved for and claimed in, my divisional application Serial No. 584,220, filed December 31, 1931.

What is claimed is:—

1. An apparatus for hot welding and mechanically working a substance in a vacuum, said apparatus including a chamber formed by a housing mounted upon a base, said chamber being vacuum-tight; cooling means for said housing and base; means for exhausting the chamber and for introducing a gas; means for securing access to the interior of the chamber; means within the chamber for welding and mechanically working the substance under treatment; means for supplying electric current to said welding and working means; and means for observing the operations and for ascertaining the temperature within said chamber.

2. An apparatus for hot welding and mechanically working a substance in a suitable gas, said apparatus including a chamber formed by a housing mounted upon a base, said chamber being gas-tight; cooling means for said housing and base; means for introducing and means for withdrawing gas to any desired extent; means for securing access to the interior of the chamber; means within the chamber for welding and mechanically working the substance under treatment; means for supplying electric current to said welding and working means; and means for observing the operations and for ascertaining the temperature within said chamber.

3. An apparatus for hot welding and mechanically working a substance in a non-injurious atmosphere, said apparatus including a containing chamber formed by a housing mounted upon a base, said chamber being sufficiently tight for the atmosphere employed; cooling means for said housing and base; means for securing access to the interior of the chamber; means for introducing a clean-up agent into said chamber; means within said chamber for welding and mechanically working the substance under treatment; means for supplying electric current to said welding and working means; and means for observing the operations and for ascertaining the temperature within said chamber.

4. An apparatus for hot welding and mechanically working a substance in a non-injurious atmosphere, said apparatus including a containing chamber formed by a housing mounted upon a base, said chamber being sufficiently tight for the atmosphere employed; cooling means for said housing and base; means for exhausting the chamber and for introducing a gas; means for securing access to the interior of the chamber; means for heating the substance to be treated; rolls within said chamber for welding and working said substance; means for supporting and driving said rolls; and means for observing the operations and for ascertaining the temperature within said chamber.

5. An apparatus for hot welding and mechanically working a substance in a non-injurious atmosphere, said apparatus including a containing chamber formed by a housing mounted upon a base, said chamber being sufficiently tight for the atmosphere employed; cooling means for said housing and base; means for exhausting the interior of the chamber and for introducing a gas; means for securing access to the interior of the chamber; means for preheating the substance to be treated; rolls within said chamber for welding and working said substance; means for supporting and driving said rolls; and means for observing the operations and for ascertaining the temperature within said chamber.

6. An apparatus for hot welding and mechanically working a substance in a non-injurious atmosphere, said apparatus including a containing chamber formed by a housing mounted upon a base, said chamber being sufficiently tight for the atmosphere employed; cooling means for said housing and base; means for exhausting the interior of the chamber and for introducing a gas; means for securing access to the interior of the chamber; rolls within said chamber for welding and working the substance under treatment; means for supporting and driving said rolls; means for passing an electric current from one roll transversely through the substance under treatment to the other rolls; and means for observing the operations and for ascertaining the temperature within said chamber.

7. An apparatus for hot welding and mechanically working a substance in a non-injurious atmosphere, said apparatus including a containing chamber formed by a housing mounted upon a base, said chamber being sufficiently tight for the atmosphere employed; cooling means for said housing and base; means for exhausting the interior of the chamber and for introducing a gas; means for securing access to the interior of the chamber; means within the chamber for welding and mechanically working a substance under treatment; means for heating the parts which directly apply mechanical pressure to said substance; and means for observing the operations and for ascertaining the temperature within said chamber.

8. An apparatus for hot welding and mechanically working a substance in a non-injurious atmosphere, said apparatus including a chamber sufficiently tight for the atmosphere employed; means for heating the substance under treatment; rolls within said chamber for welding and working the substance under treatment; means for driving said rolls; and means for reversing the rotation of said rolls.

9. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; and an electrically heated tube in advance of said rolls for heating the substance under treatment before it passes through the rolls.

10. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; an electrically heated tube in advance of said rolls for heating the substance under treatment before it passes through the rolls; and a reflector tube surrounding said preheating tube.

11. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; an electrically heated tube in advance of said rolls for heating the substance under treatment before it passes through the rolls; and an electrically heated reflector tube surrounding said preheating tube.

12. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; a preheating tube in advance of said rolls; and a plurality of concentrically arranged reflector tubes surrounding said preheating tube.

13. An apparatus for hot welding and mechanically working a substance in non-injurious atmosphere, said apparatus including a chamber sufficiently tight for the atmosphere employed; means for exhausting the interior of the chamber and for introducing a gas; rolls within said chamber for welding and working the substance under treatment; and electrically heated tubes, one on either side of the rolls, for heating the substance under treatment preparatory to its passing between the rolls in either direction.

14. An apparatus for hot welding and mechanically working a substance in an non-injurious atmosphere, said apparatus including a chamber sufficiently tight for the atmosphere employed; means for exhausting the interior of the chamber and for introducing a gas; rolls within said chamber for welding and working the substance under treatment; electrically heated tubes, one on either side of the rolls, for heating the substance under treatment preparatory to its passing between the rolls in either direction; and a reflector tube surrounding each of said preheating tubes.

15. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; electrically heated tubes, one on either side of the rolls, for heating the substance under treatment preparatory to its passing between the rolls in either direction; and an electrically heated reflector tube surrounding each of said preheating tubes.

16. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; heating tubes, one on either side of said rolls; and a plurality of concentrically arranged reflector tubes surrounding each of said heating tubes.

17. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; means for heating said substance before it passes to the rolls; and means for passing electric current transversely through said substance from one roll to the other, to further heat said substance.

18. An apparatus for hot welding and mechanically working a substance in a non-injurious atmosphere, said apparatus including a chamber sufficiently tight for the atmosphere employed; means for exhausting the interior of the chamber and for introducing a gas; rolls within said chamber for welding and working the substance under treatment; means for heating said substance before it passes to the rolls; means for passing electric current transversely through said substance from one roll to the other, to further heat said substance; and means for re-heating said substance preparatory to its passage between the rolls in reverse direction.

19. In apparatus for hot welding and mechanically working a substance in a non-injurious atmosphere, a chamber sufficiently tight for the atmosphere employed; rolls within said chamber for welding and working the substance under treatment; means for imparting rotation to and for reversing the rotation of said rolls; means for heating the substance under treatment preparatory to its passage between the rolls in either direction; and means for passing electric current from one roll to the other and through the interposed substance under treatment.

20. An apparatus for hot welding and mechanically working a substance in a non-injurious atmosphere, said apparatus including a chamber sufficiently tight for the atmosphere employed; rolls within said chamber for welding and working the substance under treatment; a preheating tube; a plurality of concentrically arranged reflector tubes surrounding said preheating tube; a support for the upper ends of all of said tubes and making electrical connection with each, said tubes being spaced apart; and an individual supporting bracket for the lower end of each of said tubes and making electrical connection therewith.

21. An apparatus for hot welding and mechanically working a substance in a non-injurious atmosphere, said apparatus including a chamber sufficiently tight for the atmosphere employed; rolls within said chamber for welding and working the substance under treatment; a preheating tube; a plurality of concentrically arranged reflector tubes surrounding said preheating tube; a support for the upper ends of all of said tubes and making electrical connection with each, said tubes being spaced apart; a second set of heating and reflector tubes on the side of the rolls opposite the first set; a series of two-armed brackets, the upper arm of each bracket supporting and making electrical connection with the lower end of one of the tubes of the first set and the lower arm of each bracket supporting and making electrical connection with the upper end of a corresponding tube of the second set; and an individual supporting bracket for the lower end of each tube of the second set and making electrical connection therewith.

22. An apparatus for hot welding and mechanically working a substance in a non-injurious atmosphere, said apparatus including a chamber sufficiently tight for the atmosphere employed; rolls within said chamber for welding and working the substance under treatment; means for supporting and driving said rolls, and means for passing electric current transversely through said substance from one roll to the other, to heat said rolls to the appropriate temperature.

23. An apparatus for hot welding and mechanically working a substance in a non-injurious atmosphere, said apparatus including a chamber sufficiently tight for the atmosphere employed; means within said chamber for welding and working the substance under treatment; a preheating tube in advance of said welding and working means; a plurality of concentrically arranged reflector tubes surrounding said preheating tube; and means whereby heat may be supplied to any desired number of the tubes at will.

24. An apparatus for hot welding and mechanically working a substance in a non-injurious atmosphere, said apparatus including a chamber sufficiently tight for the atmosphere employed; means within said chamber for welding and working the substance under treatment; heating tubes and reflector tubes on either side of said welding and working means; means whereby heat may be supplied to any desired number of the tubes at will; and means for traversing the substance under treatment in reverse directions past the welding and working means.

25. In apparatus of the character described, a gland for packing a moving part, comprising a cylindrical gland body; packing of metal carbon within the gland body; a movable vacuum seal body within said gland body and bearing on said packing; means for compressing the packing; annular grooves in the exterior and interior surfaces of the vacuum seal body, said grooves communicating with each other; and means for making connection with an exhaust system, said means communicating with said grooves.

26. In apparatus of the character described, a gland for packing a moving part, comprising a cylindrical gland body; packing within said gland body; a movable vacuum seal body within the gland body and bearing on said packing; means for compressing the packing; annular grooves in the exterior and interior surfaces of the vacuum seal body, said grooves communicating with each other; and means for making connection to an exhaust system, said means communicating with said grooves.

27. In apparatus of the character described, an electrically insulated stud; a support through which said stud passes; insulation between said stud and support; annular grooves in said stud and support; a passage in said insulation affording communication between said grooves; a passage through said stud communicating with said annular grooves; and means affording communication with said passage.

28. In apparatus of the character described, a support for making electrical connection with a body to be heated, said support being formed of a metal having a relatively low fusion point; a body to be heated; and an intermediate body of refractory metal between said support and the body to be heated, and serving to effect a sufficient temperature gradient between the body heated and the support.

29. Apparatus as in claim 8, the rolls of which have a very high heat conductivity and a fusion point higher than that of tungsten.

30. Apparatus as in claim 12, the preheating and reflector tubes of which have a fusion point higher than that of tungsten, a lower electrical resistance and surface radiation of energy than any known form of carbon, and the deterioration of which under working conditions is inconsiderable.

CONWAY ROBINSON.